Nov. 29, 1949 V. WRIGHT 2,489,694
MOWER
Filed June 21, 1946 2 Sheets-Sheet 1

Virgil Wright
INVENTOR.

BY Cecil L. Wood
ATTORNEY

Nov. 29, 1949 V. WRIGHT 2,489,694
MOWER
Filed June 21, 1946 2 Sheets-Sheet 2
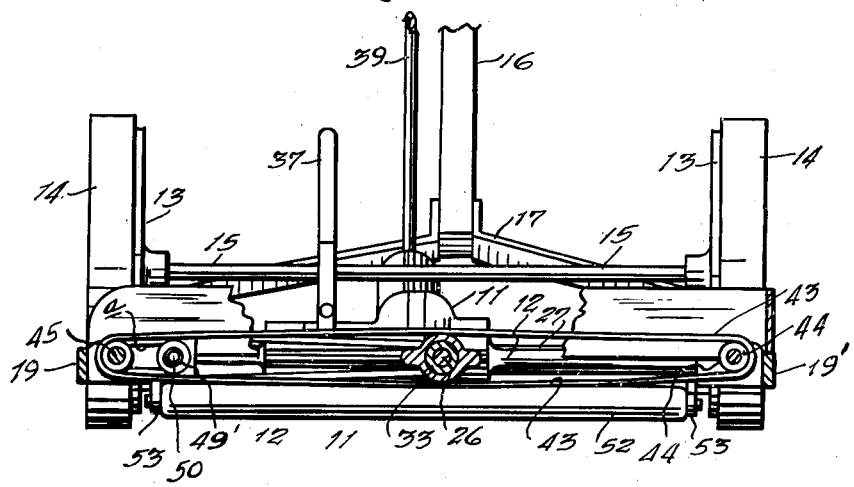
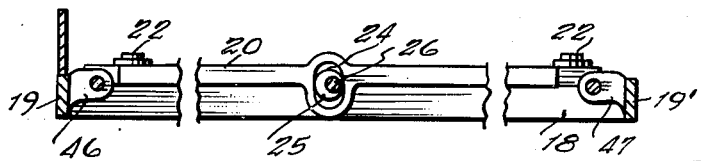
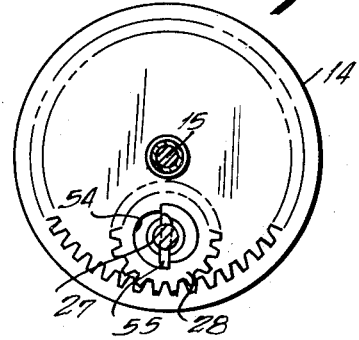
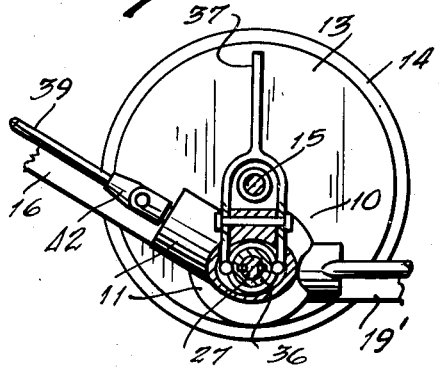
Virgil Wright
INVENTOR.
BY Cecil L. Wood
ATTORNEY Patented Nov. 29, 1949

2,489,694

UNITED STATES PATENT OFFICE 2,489,694

MOWER

Virgil Wright, Fort Worth, Tex.

Application June 21, 1946, Serial No. 678,317

2 Claims. (Cl. 56—258)

This invention relates to weed and grass cutting devices, or lawn mowers, and it has particular reference to a type of mower operating with a serrated sickle capable of lateral oscillation as the device moves along the ground, and its principal object resides in the provision of a mechanism in which is included a side delivery conveyor for the grass and weeds cut by the invention instead of the conventional grass carrier usually attached to the conventional type of lawn mower for catching the grass, weeds, and the like, after same have been cut.

Another object of the invention resides in the provision of an oscillating cutting element which extends well in front of the carriage which renders the device highly useful in cutting vegetation close to fences, walls, curbs, and the like, incapable of being reached by the conventional type of lawn mower whose cutting blades and rotor are usually positioned behind the forward peripheries of the carriage wheels.

Yet another object of the invention is manifest in the provision of a mechanism which includes a manually controlled sickle by which the latter can be manually operated without manipulating the entire carriage, thus providing a means for actuating the sickle in close quarters as in corners, along fence lines, against buildings, and the like.

Broadly, the invention seeks to comprehend the provision of a simplified structure embodying such features as an oscillating sickle capable of operation in the manner the common lawn mower is operated, the feature of a side delivery conveyor or grass carrier, a manually operated sickle by which the latter can be oscillated without moving the carriage of the invention, and a clutch by which the device may be rendered inoperative with respect to its traction wheels when it is desirable to manually manipulate the sickle bar.

While the foregoing objects are paramount, other and lesser objects will become manifest as the description proceeds taken in connection with the appended drawings, wherein:

Figure 3 illustrates the invention from the front showing the cutter bar and sickle removed, the said view being taken on lines 3—3 of Figure 1, and shows the grass carrier and clutch lever, as well as the height adjustment roller for the cutter bar.

Figure 4 is a lateral section taken on lines 4—4 of Figure 1 illustrating the cam arrangement by which the sickle is oscillated on the sickle bar.

Figure 5 is a fragmentary cross-sectional illustration taken on lines 5—5 of Figure 2 showing the clutch mechanism, and Figure 6 is a cross-sectional view, taken on lines 6—6 of Figure 2, illustrating the inner side of one of the wheel pawls preventing reverse action of the gear so that the operating shaft functions only when the carriage moves forward.

Figure 1:
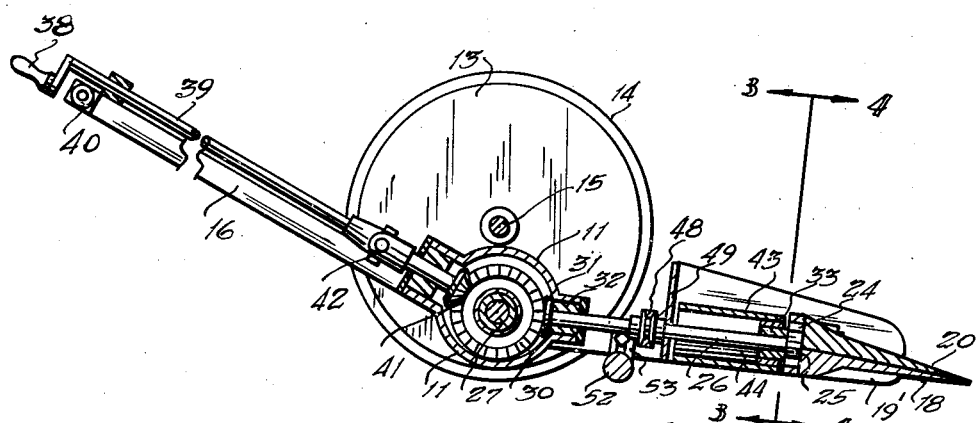
Figure 1 is a longitudinal cross-section of the invention taken on lines 1—1 of Figure 2 illustrating the inner closure for the left-hand wheel, the driving gear arrangement and the manually operated mechanism by which the sickle bar can be actuated without moving the carriage.

The invention comprises a frame structure 10 which includes a housing 11 having an open portion 12 on each side thereof which extends laterally through the invention and has integral circular members 13 on each end providing closures for the inside of each wheel 14.

Figure 2:
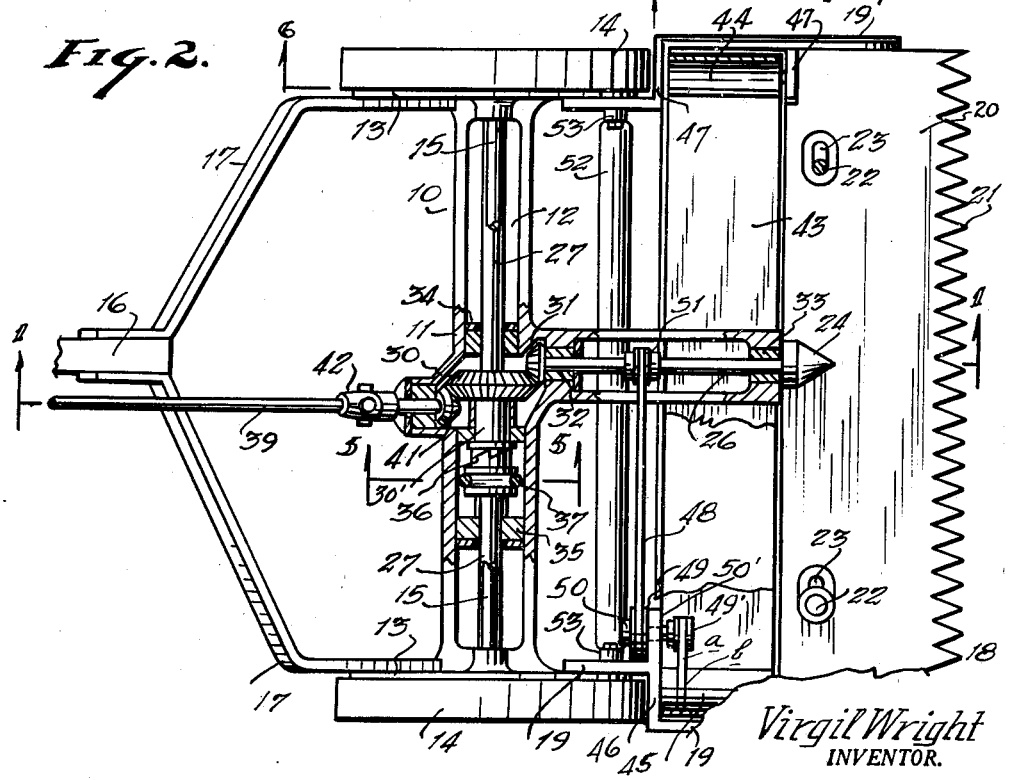
Figure 2 is a plan view of the invention showing portions of the housing and frame cut away illustrating the gear arrangement and bearings, and showing the relationship of the grass conveyor with respect to the sickle bar and sickle.

The wheels 14 are mounted on each end of an axle 15 extending laterally through the invention above the housing 11, as illustrated in Figures 1 and 2. A handle 16 by which the invention is moved along the ground is attached to each of the circular members 13 by connecting brackets 17 shown particularly in Figure 2.

A sickle bar 18 is supported forwardly of the invention by bracket members 19 and 19' whose rearmost ends are rigidly secured to the circular members 13. The bar 18 extends beyond the frame and the members 13 in front of the wheels 14, as shown in Figure 2, so that the cutting range of the sickle 20 is increased to permit operation along walls, fences, and other not readily accessible places. The forward or operative edge of the sickle bar 18 is serrated, as in Figure 2, and the sickle 20 is laterally positioned thereon and is capable of longitudinal oscillation, its serrations, or cutting teeth 21, being conformable to the serrations of the cutter bar 18 so that, as the sickle 20 is rapidly moved with respect to the cutter bar 18, grass or weeds against which the assembly is urged can be severed.

The sickle 20 is slidably secured to the sickle bar 18 by studs 22 arranged through slots 23, as shown in Figure 2, to permit longitudinal movement of the sickle 20 on the bar 18. The sickle 20 is formed along its rearmost edge, and intermediate its ends, with a receptacle 24 which is substantially oval and has its greater length vertical with respect to the sickle bar 18. An eccentric cam 25 is adapted to be rotated within the receptacle 24 and is rigidly mounted upon the forward end of a lateral shaft 26, shown in Figures 1 and 2, and which will be described in greater detail presently.

The main drive shaft 27 of the invention is arranged through the housing 11 and has a small gear 28 rigid at each end thereof which meshes with the internal gear 29 integral with each of the wheels 14, as illustrated particularly in Figure 6. Substantially intermediate the ends of the shaft 27 is arranged a dual-faced bevelled gear 30 and meshed with one of its faces is a small bevelled gear 31 rigid with the end of the lateral shaft 26, previously described, and by which the latter is rotated to oscillate the sickle 20 through the medium of the eccentric cam 25 also previously described. The shaft 26 is journalled at each end in bearings 32 and 33 arranged in the partially open housing extending laterally from the main housing 11 and integral therewith, in the manner illustrated in Figure 2.

The main shaft 27 is journalled on each side of the dual-faced bevelled gear 30 in bearings 34 and 35 which are suitably sealed in order that the gears 30 and 31 can operate in a bath of oil, if desired. A clutch 36 having a suitable operating fork 37, is provided by which the invention can be operated into and out of gear. The gear 30 has a sleeve 30' integral therewith on the end of which, opposite the gear, is formed one set of the clutch claws.

An arrangement is provided by which the sickle 20 can be operated without moving the invention on its wheels 14. This is accomplished by disengaging the clutch 36 so that the shaft 27 can be rotated by means of a manually operated crank 38 on a shaft 39 extending from the handle bar 40 downwardly along the handle 16 and into the housing 11 where a small bevelled gear 41 is rigidly secured to its end and meshes with the gear 30 on the opposite side from the gear 31 by which, through the gear 30, the shaft 26 is rotated and thus the sickle 20 manually oscillated. It is desirable to provide a universal joint 42 in the shaft 39 and near the housing 11, as shown in Figures 1 and 2, to insure the proper function of the shaft 39.

A belt type of conveyor 43 is provided and is capable of moving laterally of the invention behind the cutter bar 18, as shown particularly in Figure 2, and its rollers 44 and 45 are pivotally mounted between integral journals 46 on one end and 47 at its opposite end. These journals or brackets 46 and 47 are integral with the forwardly extending frame members or brackets 19 and 19' to which the sickle bar 18 is attached. The conveyor 43 is driven by a belt 48 operating on a pulley 49 attached to a stub shaft 50 journalled in the bracket 50' integral with the members 19 and 19', as shown in Figure 2, the belt 48 being also arranged upon a V-type of pulley 51 on the shaft 26. Another small V-pulley 49' is attached to the opposite end of the stub shaft 50 and a V-belt $a$ is arranged thereon which operates in a V-groove $b$ in the conveyor roller 45.

The cutter bar 18 may be adjusted with respect to the ground surface through the medium of a roller 52 pivotally journalled at each end in slotted brackets 53 attached to the extended frame members 19 and 19'. This arrangement is similar to the conventional type of lawn mower.

In Figure 6 is illustrated the internal gearing of each of the wheels 14, each having an internal arrangement of teeth 29 which are engageable by a driven pinion or gear 28 formed with a recess 54 in which a clicking pawl 55 operates. The pawl 55 is slidably arranged through a slot in the shaft 27, and on each end thereof, so that the latter can be rotated as the invention is moved forward, but when the latter is moved backwards the pawl is disengaged and the wheels move free.

Obviously, the invention is capable of certain changes and modifications by persons skilled in the art without departing from the spirit and intent of the invention or the scope of the appended claims.

What is claimed is:

1. In a lawn mower, in combination, a frame member having a handle and a pair of traction wheels, a drive shaft for said wheels capable of being rotated thereby in forward movement of the assembly, a dual-faced bevel gear freely rotatable on said shaft intermediate said wheels, a transverse shaft driven by said gear and extending forwardly from said drive shaft, a stationary sickle bar and a sickle arranged for longitudinal oscillation thereon, a cam on said transverse shaft engaging said sickle transmitting oscillating motion thereto, a grass conveyor operatively arranged in said frame rearwardly of said sickle bar and sickle, and manual means including a crank operated shaft and gear engageable with said dual-faced gear for operating said sickle.

2. In a lawn mower, or the like, in combination with a frame having an axle therein, a drive shaft for said wheels arranged below said axle and having a driven connection with said wheels, a handle and traction wheels on said axle capable of rotating the said drive shaft in operation, a sickle bar arranged forwardly of said frame and extending at each end in front of said wheels, a sickle oscillatively arranged on said bar, a transverse shaft arranged in said frame at right angles to said axle and forwardly thereof, a bevel gear and pinion providing a driven connection between said drive shaft and said transverse shaft as the assembly is moved forward, the said transverse shaft providing for the oscillation of said sickle, and means including a shaft extending rearwardly of and transversely from said drive shaft providing for the manual oscillation of said sickle independently of said wheels.

VIRGIL WRIGHT.

REFERENCES CITED

The following references are of record in the file of this patent:

UNITED STATES PATENTS

| Number | Name | Date |
|---|---|---|
| 339,616 | Campbell | Apr. 13, 1886 |
| 1,140,526 | Patterson | May 25, 1915 |